United States Patent
Solomon

(10) Patent No.: US 6,941,408 B2
(45) Date of Patent: Sep. 6, 2005

(54) BUS INTERFACE SYSTEM WITH TWO SEPARATE DATA TRANSFER INTERFACES

(75) Inventor: Richard L. Solomon, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 401 days.

(21) Appl. No.: 10/261,311

(22) Filed: Sep. 30, 2002

(65) Prior Publication Data

US 2004/0064623 A1 Apr. 1, 2004

(51) Int. Cl.[7] .............................................. G06F 13/14
(52) U.S. Cl. .................... 710/310; 710/311; 710/313; 710/38; 710/39; 710/61
(58) Field of Search ................................ 710/305–317, 710/105–107, 110–112, 58–61, 36–39, 20–22, 27–28, 7

(56) References Cited

U.S. PATENT DOCUMENTS

| | | | |
|---|---|---|---|
| 5,634,033 A | * | 5/1997 | Stewart et al. ............... 711/114 |
| 5,682,509 A | * | 10/1997 | Kabenjian .................. 710/312 |
| 5,745,732 A | | 4/1998 | Cherukuri et al. |
| 5,875,343 A | | 2/1999 | Binford et al. |
| 5,905,876 A | | 5/1999 | Pawlowski et al. |
| 5,991,843 A | | 11/1999 | Porterfield et al. |
| 6,061,754 A | | 5/2000 | Cepulis et al. |
| 6,065,083 A | * | 5/2000 | Garcia et al. ............... 710/315 |
| 6,067,071 A | | 5/2000 | Kotha et al. |
| 6,088,740 A | | 7/2000 | Ghaffari et al. |
| 6,170,030 B1 | | 1/2001 | Bell |
| 6,233,628 B1 | | 5/2001 | Salmonsen et al. |
| 6,266,778 B1 | | 7/2001 | Bell |
| 6,279,051 B1 | * | 8/2001 | Gates et al. ................... 710/20 |
| 6,442,641 B1 | * | 8/2002 | Bury et al. ................. 710/305 |
| 6,449,677 B1 | | 9/2002 | Olarig et al. |
| 6,490,644 B1 | | 12/2002 | Hyde, II et al. |
| 6,564,271 B2 | | 5/2003 | Micalizzi, Jr. et al. |
| 6,578,096 B1 | | 6/2003 | Steinmetz et al. |
| 6,631,437 B1 | | 10/2003 | Callison et al. |
| 6,820,165 B2 | * | 11/2004 | Pannell ....................... 710/313 |
| 2002/0083256 A1 | | 6/2002 | Pannell |
| 2003/0135675 A1 | * | 7/2003 | Pontius et al. .............. 710/107 |

FOREIGN PATENT DOCUMENTS

EP 0486230 5/1992

* cited by examiner

Primary Examiner—Paul R. Myers
Assistant Examiner—Raymond N Phan
(74) Attorney, Agent, or Firm—Suiter West Swantz PC LLO

(57) ABSTRACT

The present invention is directed to an interface. In an aspect of the present invention, an interface system suitable for coupling a bus interface controller with a back-end device includes a bus interface controller and a back-end device in which the back-end device is coupled to the bus interface controller via an interface. The interface includes a command queuing interface suitable for enqueueing a transaction, a command completion interface suitable for reporting transaction completion and a data transfer interface suitable for transferring data. The data transfer interface includes an inbound data transfer interface suitable for transferring data and an outbound data transfer interface suitable for transferring data. The inbound data transfer interface and the outbound data transfer interface are suitable for processing commands simultaneously.

20 Claims, 3 Drawing Sheets

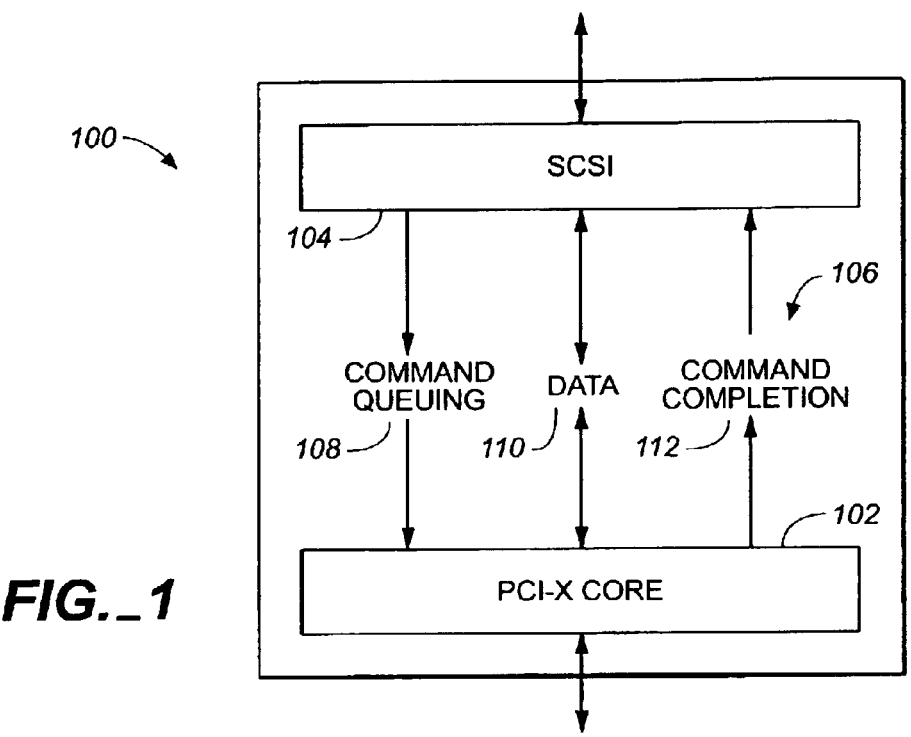
FIG._1
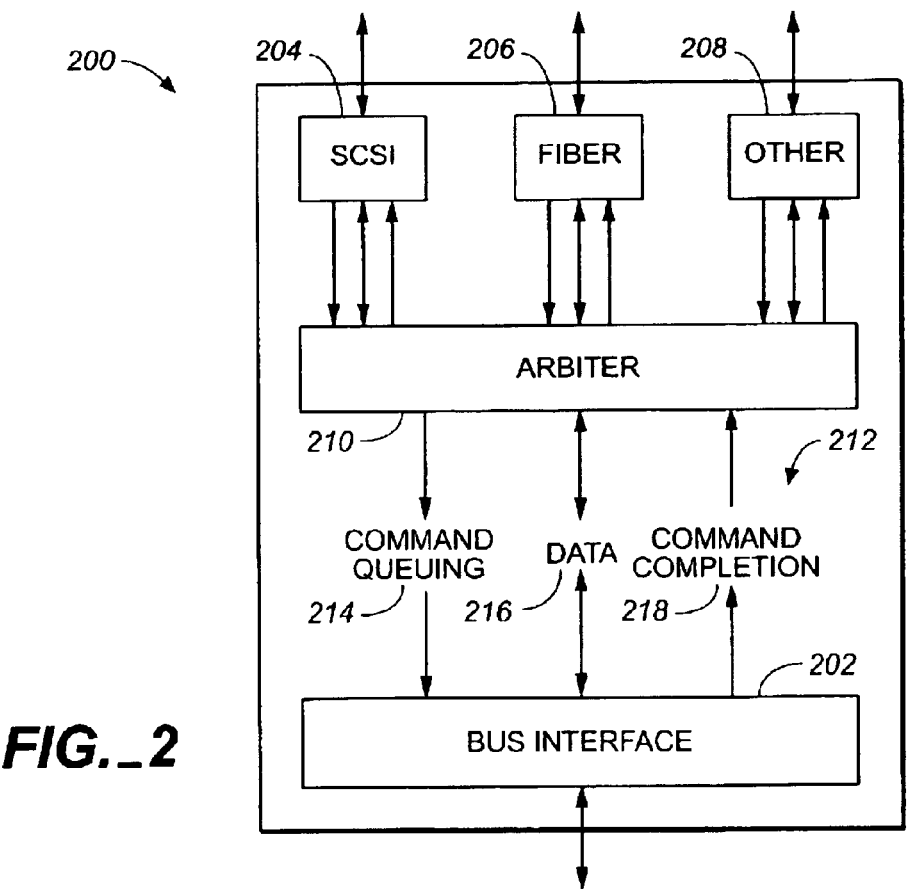
FIG._2

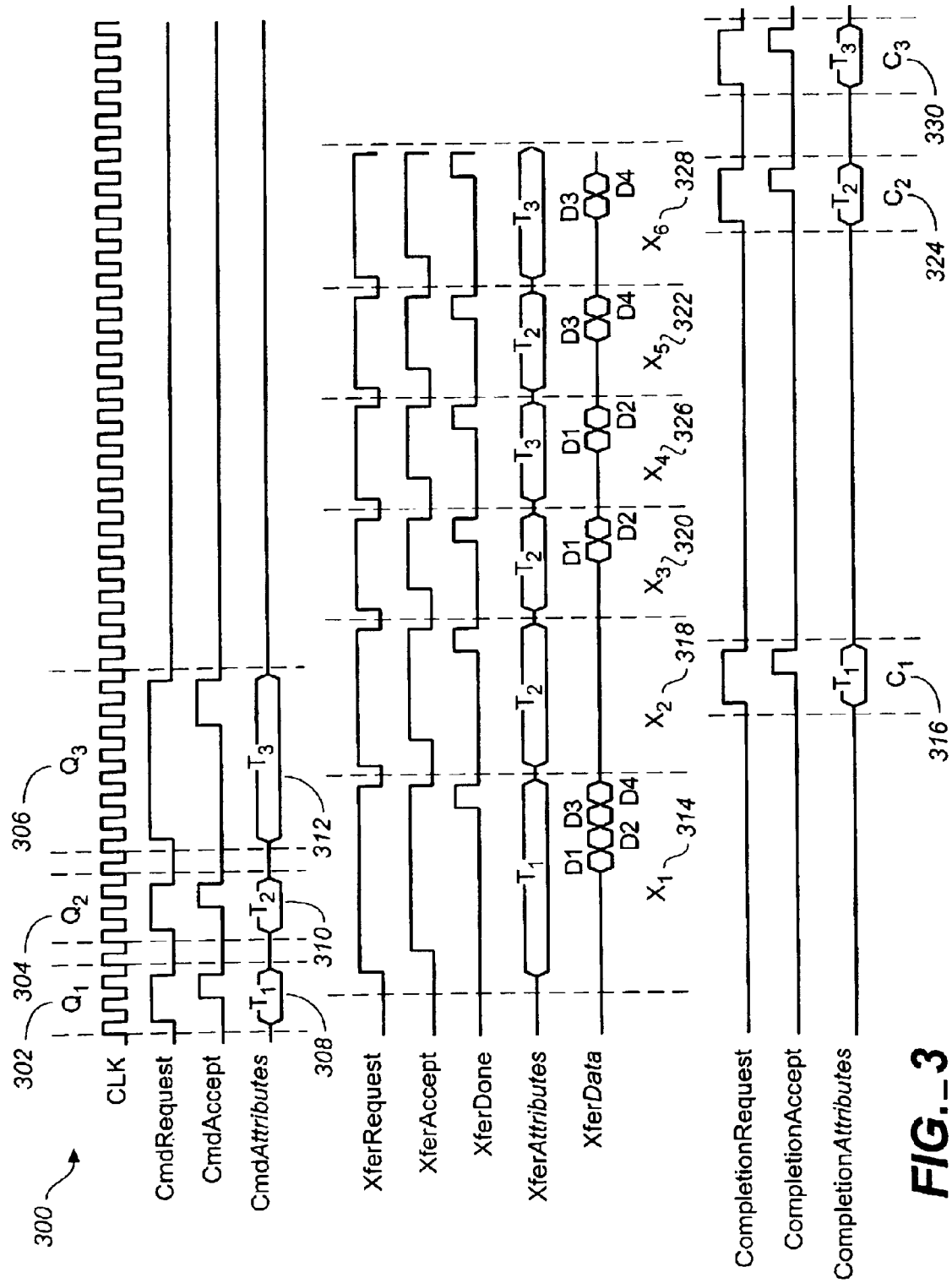
FIG._3

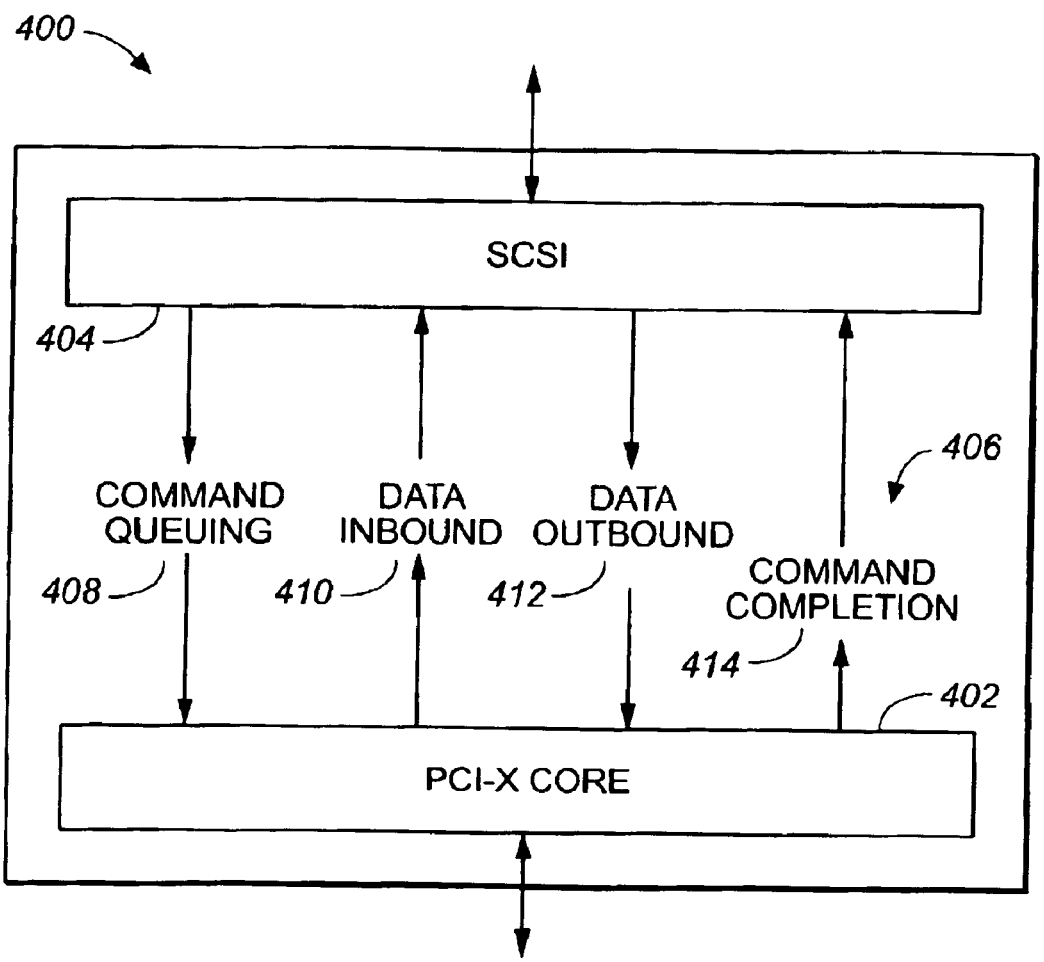
FIG._4

BUS INTERFACE SYSTEM WITH TWO SEPARATE DATA TRANSFER INTERFACES

CROSS REFERENCE TO RELATED APPLICATION

The present invention incorporates U.S. patent application Ser. No. 09/736,883, filed Dec. 14, 2000, titled "Interface for Bus Independent Core" by reference in its entirety.

FIELD OF THE INVENTION

The present invention generally relates to the field of bus controllers, and particularly to an interface for a bus independent core.

BACKGROUND OF THE INVENTION

Information handling systems, such as desktop computers, servers, network appliances, and the like, are driving the expansion of the modern economy. Because information handling systems are performance driven, system throughput is vital for differentiating products, such as products that exchange massive amounts of information, both internally and externally, with storage devices, network interface cards, and the like. Therefore, increases in the ability to transfer data both within the system itself and transfer data over a network may afford competitive advantages for systems able to provide these advances.

Once such problem is the transfer of data within the information handling system itself. Due to rapid advancements in processor speed, storage device access times, network speed, and the like, the bandwidth available within the system has steadily eroded. Thus, advancements in the ability of a system to input and output data are at the cutting edge of information handling system development. However, development of faster bus standards has encountered some limitations, namely the dependency of the operations of internal buses to external buses. For example, bus interface controller cores often have internal interfaces, which are tightly tied to the external bus. The internal interfaces may require agents connecting to them to have knowledge of various external bus characteristics, such as disconnection points and byte alignment. Previously, changes in external bus interfaces have required redesign of numerous internal modules. Although attempts have been made at removing external bus dependence from internal interfaces, changes in external bus interfaces typically require redesign of numerous internal modules.

Therefore, it would be desirable to provide an interface for a bus independent core.

SUMMARY OF THE INVENTION

Accordingly, the present invention is directed to an interface for a bus independent core. In a first aspect of the present invention, an interface system suitable for coupling a bus interface controller with a back-end device includes a bus interface controller and a back-end device in which the back-end device is coupled to the bus interface controller via an interface. The interface includes a command queuing interface suitable for enqueueing a transaction, a command completion interface suitable for reporting transaction completion and a data transfer interface suitable for transferring data. The data transfer interface includes an inbound data transfer interface suitable for transferring data and an outbound data transfer interface suitable for transferring data. The inbound data transfer interface and the outbound data transfer interface are suitable for processing commands simultaneously.

In a second aspect of the present invention, a method for transferring data includes enqueueing a transaction on a command queuing interface, transferring data corresponding to the transaction on a data transfer interface while simultaneously transferring data corresponding to a second transaction on the data transfer interface, and receiving notification of completion of the transfer of data corresponding to the transaction, the notification reported on a command completion interface.

In a third aspect of the present invention, an interface system suitable for coupling a first bus interface controller with a second bus interface controller includes a first bus interface controller suitable for coupling to a backend device and a second bus interface controller suitable for coupling to an internal bus of an information handling system. The second bus interface controller is coupled to the first bus interface controller via an interface. The interface includes a command queuing interface suitable for enqueueing a transaction, a command completion interface suitable for reporting transaction completion and a data transfer interface suitable for transferring data. The data transfer interface includes a separate inbound data transfer interface suitable for transferring data and a separate outbound data transfer interface suitable for transferring data.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is an illustration of an exemplary embodiment of the present invention wherein an interface system includes a command queuing interface, data transfer interface and a command completion interface;

FIG. 2 is an additional illustration of an exemplary embodiment of the present invention wherein a variety of bus interfaces supported by a triple bus interface of the present invention are shown;

FIG. 3 is an illustration depicting an exemplary embodiment of the present invention wherein a backend device utilizes an interface of the present invention; and FIG. 4 is a highly diagrammatic view of an exemplary embodiment of the present invention wherein an interface system includes a command queuing interface, data transfer interface having separate buses, and a command completion interface.

DETAILED DESCRIPTION OF THE INVENTION

Reference will now be made in detail to the presently preferred embodiments of the invention, examples of which are illustrated in the accompanying drawings.

Referring generally now to FIGS. 1 through 4, exemplary embodiments of the present invention are shown. The present invention is shown in conjunction with a bus suitable for operation in a Peripheral Component Interconnect (PCI)

and PCI-X architectures. Although, a bus suitable for operation in both conventional PCI and PCI-X modes is described, a wide variety of bus architectures are contemplated without departing from the spirit and scope of the present invention.

Referring now to FIG. 1, an exemplary embodiment 100 of the present invention is shown wherein an interface system includes a command queuing interface, data transfer interface and a command completion interface. Typically, bus interface controllers, such as controller cores and the like, have internal interfaces which are tightly tied to an external bus. The internal interfaces may require agents connecting to them to have knowledge of various external bus characteristics, such as disconnection points and byte alignment. Thus, previously, changes in external bus interfaces have required redesign of numerous internal modules. A bus interface of the present invention provides a generic interface that would not require an extensive redesign of numerous internal modules when utilizing a different bus interface controller, thereby greatly increasing the flexibility of the bus interface system.

For example, a bus interface system 100 may include a first bus interface controller, in this instance a PCI-X core 102 coupled to a second bus interface controller, in this instance a SCSI core 104, via an interface 106. The interface 106 includes a command queuing interface 108, a data transfer interface 110 and a command completion interface 112. The command queuing interface 108 enables backend master devices to enqueue transactions. The command completion interface 112 enables a core to report transaction completion. Each exchange on the command completion interface 112 corresponds to a command enqueued on the command queuing interface 108. The data transfer interface 110 may be utilized to move data into (inbound) or out of (outbound) a backend master's buffer. Multiple transfers on the data transfer interface 110 may reference a single transaction queued on the command queuing interface 108. Thus, the command queuing interface 108, command completion interface 112 and data transfer interface 110 provide a de-coupled control/data path architecture to a backend master device. Command and control information may be exchanged on the command queuing interface 108 and command completion interface 112 while data is exchanged on the data transfer interface 110. Therefore, data for a given transaction may be moved without respect to transactions being requested on the control bus.

Referring now to FIG. 2, an exemplary embodiment of the present invention is shown wherein a variety of bus interfaces are supported by a triple bus interface of the present invention. A bus interface system 200 may include a first bus interface 202, such as to a PCI bus, PCI-X bus, and the like, and a variety of additional bus interfaces, such as a SCSI interface 204, fiber interface 206, or other interface 208 as contemplated by a person of ordinary skill in the art. An arbiter 210 is provided for arbitration of commands. For example, the arbiter 210 may resolve competing demands for the interface. This may be accomplished by intercepting the commands from the first bus interface 202 and the variety of other bus interfaces provided 204, 206 & 208. Preferably, only commands are intercepted, since the other data, such as completion and data includes ID and tag data.

An interface 212 is included between the arbiter 210 and the first bus interface 202. The interface 212 includes a command queuing interface 214, a data transfer interface 216 and a command completion interface 218. The command queuing interface 214 enables the variety of second interface controllers 204, 206 & 208 to enqueue transactions. The command completion interface 218 enables cores to report transaction completion. Exchanges on the command completion interface 218 correspond to a command enqueued on the command queuing interface 214.

The data transfer interface 216 may be utilized to move data into (inbound) or out of (outbound) a backend master's buffer. Multiple transfers on the data transfer interface 216 may reference a single transaction queued on the command queuing interface 214. Thus, the command queuing interface 214, command completion interface 218 and data transfer interface 216 provide a de-coupled control/data path architecture to a backend master device. Command and control information may be exchanged on the command queuing interface 214 and command completion interface 218 while data is exchanged on the data transfer interface 216. Therefore, data for a given transaction may be moved from the second bus interface controller 204, 206 & 208 without respect to transactions being requested by any other controller 204, 206 & 208.

In this way, command queuing and completion are separate from each other and from the data transfer path. Multiple agents may be supported, as well as multiple commands per agent. Data transfers may occur in any order, and have no dependence on possible alignment requirements of the external bus. Commands may also complete in any order.

Referring now to FIG. 3, an exemplary embodiment of the present invention is shown wherein a backend device utilizes an interface of the present invention. Commands shown in the Figure correspond to the exemplary commands shown in the following discussion. In this example, a backend queues up three commands, $Q_1$ 302, $Q_2$ 304, and $Q_3$ 306 with attribute tags $T_1$ 308, $T_2$ 310 and $T_3$ 312. $Q_1$ 302 generates one data transfer cycle, X1 314 to move the data and one completion cycle C1 316 to acknowledge completion of the tag and signal the backend to retire tag T1. $Q_2$ 304 generates three data transfer cycles, $X_2$ 318 reflects a retry on the PCI bus without any data being moved, $X_3$ 320 moves some of the data, $X_5$ 322 moves the remaining data, and one completion cycle, $C_2$ 324 to acknowledge completion of the tag and signal the backend to retire tag $T_2$. $Q_3$ 306 generates two data transfer cycles, $X_4$ 326 moves some of the data, $X_6$ 328 moves the remaining data, and once done, a completion cycle, $C_3$ 330 acknowledges completion of the tag and signals the backend to retire tag $T_3$.

In this way, command queuing and completion are separate from each other and from the data transfer path. Multiple agents may be supported, as well as multiple commands per agent. As shown in FIG. 3, data transfers may occur in any order, and have no dependence on possible alignment requirement of the external bus. Commands may complete in any order. Addresses and counts may be to byte-resolution. Although the use of an interface with respect to a PCI bus has been discussed, it should be readily apparent to a person of ordinary skill in the art that a variety of bus architectures are contemplated by the present invention without departing from the spirit and scope thereof.

The following discussion lists exemplary commands which may be utilized to perform functions utilizing the present invention, an example of which is shown in FIG. 3. Outbound (O) refers to transaction in which data flows from a backend device to the PCI bus, and inbound (I) refers to transaction in which data flows from the PCI bus to a backend device.

Command Queuing Interface

Backend master devices enqueue transactions on this interface. The core will execute one or more transfers on the data transfer interface for each transaction queued on this interface. When the transaction is complete, a single completion status will be reported on the command completion interface.

| | | |
|---|---|---|
| CmdSysAddr[63:0] | I | Address in system memory to/from which the current transaction is directed. |
| CmdLocalAddr[31:0] | I | Address in the backend device's buffer space to/from which the current transaction is directed. |
| CmdLength[23:0] | I | Length of the current transaction. |
| CmdInbound | I | High for transactions moving data from the PCI bus to the backend device. Low for transactions moving data from the backend device to the PCI bus. |
| CmdType[1:0] | I | Identifies the address space for the current transaction: 00=Memory, 01=I/O, 10=Config, 11=Split Completion. |
| CmdFunctionId[2:0] | I | Identifier which connects transaction to a set of configuration space data. |
| CmdBackendId[3:0] | I | Fixed identifier which is unique to the current backend device. The core uses this to connect transaction data transfers to the correct backend. |
| CmdTag[4:0] | I | Identified which is unique to the current transaction. Must not be reused by the backend until the transaction has been retired. |
| CmdRequest | I | Driven by the backend to indicate that the above signals are stable and represent a desired transaction. |

Command Completion Interface

The core reports transaction completion on this interface. Each exchange on this bus corresponds to a command enqueued on the command queuing interface.

| | | |
|---|---|---|
| CompletionFunctionId[2:0] | O | Identifier corresponding to backend device that requested the transaction which is being retired. |
| CompletionBackendId[3:0] | O | Identifier corresponding to backend device that requested the transaction which is being retired. |
| CompletionTab[4:0] | O | Identifier reporting the CmdTag from the transaction which is being retired. |
| CompletionStatus[1:0] | O | Reports the state of the transaction which is being retired: <br> 00 - GOOD - transaction complete without error <br> 01 - ERROR - a data error occurred but the transfer continued to completion <br> 10 - FAULT - the transaction ended with a fatal error <br> 11 - Reserved |
| CompletionRequest | O | Driven by the core to indicate that the above signals reflect a transaction to be retired. |
| CompletionAccept | I | Driven by the backend to indicate that it has retired the referenced transaction. |

Data Transfer Interface

The core uses this bus to move data into (inbound) or out of (outbound) a backend master's buffer. Multiple transfers on this bus may reference a single transaction queued on the command queuing interface.

| | | |
|---|---|---|
| XferLocalAddr[31:0] | O | Address in the backend device's buffer space to/from which the current data transfer is being directed. |
| XferLocalBE[7:0] | O | Active-high byte enables for the XferData busses. |
| XferOutboundData[63:0] | I | The core captures data off this bus for transfers moving data from the backend device to the PCI bus. (XferInbound is low). |
| XferInboundData[63:0] | O | The core presents data on this bus for transfers moving data from the PCI bus to the backend device. (XferInbound is high). |
| XferInbound | O | High for transfers moving data from the PCI bus to the backend device. Low for transfers moving data from the backend device to the PCI bus. |
| XferFunctionId[2:0] | O | Identifier corresponding to backend device that requested the transaction which generated the current transfer. |
| XferBackendId[3:0] | O | Identifier corresponding to backend device that requested the transaction which generated the current transfer. |
| XferTag[4:0] | O | Identifier reporting the CmdTag from the transaction |

-continued

| | | |
|---|---|---|
| | | which generated the current transfer. |
| XferRequest | O | Driven by the core to indicate that the above signals reflect a data transfer in progress. |
| XferAccept | I | Driven by the backend to indicate that it is ready with/for the data transfer indicated by the above signals. |
| XferDone | O | Driven by the core to indicate that the current data transfer is complete. NOTE: This signal alone DOES NOT indicate that the transaction should be retired. |

A variety of data transfer interfaces are contemplated by the present invention. For example, a data transfer interface may include a single bi-directional interface as previously described. Additionally, the data transfer interface may be divided into two or more separate buses.

Referring now to FIG. 4, an exemplary embodiment 400 of the present invention is shown wherein an interface system includes a command queuing interface, an inbound data transfer interface, an outbound data transfer interface and a command completion interface. As previously described, typically, bus interface controllers, such as controller cores and the like, have internal interfaces which are tightly tied to an external bus. A bus interface of the present invention provides a generic interface that would not require an extensive redesign of numerous internal modules when utilizing a different bus interface controller, thereby greatly increasing the flexibility of the bus interface system.

For example, a bus interface system 400 may include a bus interface controller, such as a PCI-X core 402 coupled to a back-end master device 404, such as a SCSI device, via an interface 406. The interface 406 includes a command queuing interface 408, an inbound data transfer interface 410, an outbound data transfer interface 412, and a command completion interface 414. The command queuing interface 408 enables backend master devices to enqueue transactions. The command completion interface 414 enables a core to report transaction completion. Each exchange on the command completion interface 414 corresponds to a command enqueued on the command queuing interface 408.

In this instance, a data transfer interface is provided which has two independent buses, an inbound data transfer interface 410 and an outbound data transfer interface 412 which are utilized to move data into (inbound) or out of (outbound) a backend master's buffer, respectively. Outbound refers to transactions in which data flows from a backend device to a bus, such as a PCI bus. Inbound refers to transactions in which data flows from the PCI bus to the backend device. The present embodiment provides the ability to process inbound and outbound commands simultaneously, such as reads and writes. Thus, a core may pipeline data for an outbound transaction when an inbound transaction is received without contention for a single shared bus. Additional embodiments are contemplated in which dual-simplex bus interfaces are supported.

As before, multiple transfers on the data transfer interface may reference a single transaction queued on the command queuing interface 408. Thus, the command queuing interface 408, command completion interface 414 and data transfer interface 410 & 412 provide a de-coupled control/data path architecture to a backend master device. Thus, command and control information may be exchanged on the command queuing interface 408 and command completion interface 414 while data is exchanged on the inbound and outbound data transfer interfaces 410 & 412. Therefore, data for a given transaction may be moved without respect to transactions being requested on the control bus.

The core uses the data transfer interface to move data into (inbound) or out of (outbound) a backend master's buffer. Multiple transfers on the bus may reference a single transaction queued on the command queueing interface.

| | | |
|---|---|---|
| XferInboundLocalAddr[31:0] | O | Address in the backend device's buffer space to which the current inbound data transfer is being directed. |
| XferInboundLocalBE[7:0] | O | Active-high byte enables for the XferInboundData bus. |
| XferInboundData[63:0] | O | The core presents data on this bus for transfers moving data from the PCI bus to the backend device. |
| XferInboundFunctionId[2:0] | O | Identifier corresponding to backend device that requested the transaction which generated the current inbound transfer. |
| XferInboundBackendId[3:0] | O | Identifier corresponding to backend device that requested the transaction which generated the current inbound transfer. |
| XferInboundTag[4:0] | O | Identifier reporting the CmdTag from the transaction which generated the current inbound transfer. |
| XferInboundRequest | O | Driven by the core to indicate that the above signals reflect an inbound data transfer in progress. |
| XferInboundAccept | I | Driven by the backend to indicate that it is ready for the inbound data transfer indicated by the above signals. |

-continued

| | | |
|---|---|---|
| XferInboundDone | O | Driven by the core to indicate that the current inbound data transfer is complete. NOTE: This signal alone does NOT indicate that the transaction should be retired. |
| XferOutboundLocalAddr[31:0] | O | Address in the backend device's buffer space from which the current outbound data transfer is being directed. |
| XferOutboundLocalBE[7:0] | O | Active-high byte enables for the XferOutboundData bus. |
| XferOutboundData[63:0] | I | The core captures data off this bus for transfers moving data from the backend device to the PCI bus. |
| XferOutboundFunctionId[2:0] | O | Identifier corresponding to backend device that requested the transaction which generated the current outbound transfer. |
| XferOutboundBackendId[3:0] | O | Identifier corresponding to backend device that requested the transaction which generated the current outbound transfer. |
| XferOutboundTag[4:0] | O | Identifier reporting the CmdTag from the transaction which generated the current outbound transfer. |
| XferOutboundRequest | O | Driven by the core to indicate that the above signals reflect an outbound data transfer in progress. |
| XferOutboundAccept | I | Driven by the backend to indicate that it is ready with the outbound data transfer indicated by the above signals. |
| XferOutboundDone | O | Driven by the core to indicate that the current outbound data transfer is complete. NOTE: This signal alone does NOT indicate that the transaction should be retired. |

It is believed that the interface of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An interface system suitable for coupling a bus interface controller with a back-end device, comprising:
    a bus interface controller; and
    a back-end device coupled to the bus interface controller via an interface, the interface including
        a command queuing interface suitable for enqueueing a transaction;
        a command completion interface suitable for reporting transaction completion;
        an inbound data transfer interface suitable for transferring data from the bus interface controller to the back-end device; and
        an outbound data transfer interface suitable for transferring data from the back-end device to the bus interface controller,
        wherein the inbound data transfer interface and the outbound data transfer interface are suitable for processing commands simultaneously,
        wherein inbound data transfer interface and the outbound data transfer interface operate independently.

2. The interface system as described in claim 1, wherein command and control information are suitable for being exchanged on at least one of the command queuing interface and command completion interface while data is exchanged on the data transfer interface.

3. The interface system as described in claim 1, wherein data for a transaction is suitable for being moved without respect to a current transaction being requested on a control bus.

4. The interface system as described in claim 1, wherein the back-end device enqueues a transaction on the command queuing interface, at least one transfer of data is accomplished corresponding to the transaction queued on the command queuing interface, and completion status of the transaction is reported on the command completion interface.

5. The interface system as described in claim 1, wherein a plurality of transactions are queued, the transaction are completed without regard to an order the transactions are queued.

6. The interface system as described in claim 1, wherein the bus interface controller conforms to at least one of a USB standard, SCSI standard, fiber standard and the back-end device conforms to at least one of a PCI standard and PCI-X standard.

7. The interface system as described in claim 1, wherein a plurality of data transfers on the data transfer interface are executed, the plurality of data transfers corresponding to a transaction queued on the command queuing interface.

8. A method of transferring data between a back-end device and a bus interface controller, comprising:
    enqueueing a first transaction on a command queuing interface;
    transferring data corresponding to the first transaction on a data transfer interface including an inbound data transfer interface and an outbound data transfer interface while simultaneously transferring data corresponding to a second transaction on the data transfer interface,
    wherein the data from the bus interface controller to the back-end device is transferred on the inbound data transfer interface and the data from the back-end device to the bus interface controller is transferred on the inbound data transfer interface,
    wherein the inbound data transfer interface and the outbound data transfer interface operate independently; and receiving notification of completion of the first transfer of data corresponding to the transaction, the notification reported on a command completion interface.

9. The method as described in claim 8, wherein a plurality of transactions are queued, the transaction are completed without regard to an order the transactions are queued.

10. The method as described in claim 8, wherein command and control information are suitable for being exchanged on at least one of the command queuing interface and command completion interface while data is exchanged on the data transfer interface.

11. The method as described in claim 8, wherein data for a transaction is suitable for being moved without respect to a current transaction being requested on a control bus.

12. The method as described in claim 8, wherein a back-end device enqueues a transaction on the command queuing interface, at least one transfer of data is accomplished corresponding to the transaction queued on the command queuing interface, and completion status of the transaction is reported on the command completion interface.

13. An interface system suitable for coupling a first bus interface controller with a second bus interface controller, comprising:
   a first bus interface controller suitable for coupling to a back-end device; and
   a second bus interface controller suitable for coupling to an internal bus of an information handling system, wherein the second bus interface controller is coupled to the first bus interface controller via an interface including
      a command queuing interface suitable for enqueueing a transaction;
      a command completion interface suitable for reporting transaction completion;
      a data transfer interface including
         a separate inbound data transfer interface suitable for transferring data from the first bus interface controller to the back-end device; and
         a separate outbound data transfer interface suitable for transferring data from the back-end device to the first bus interface controller,
      wherein the separate inbound data transfer interface and the separate outbound data transfer interface are suitable for transferring the data independently.

14. The interface system as described in claim 13, wherein the inbound data transfer interface and the outbound data transfer interface are suitable for processing commands simultaneously.

15. The interface system as described in claim 13, wherein command and control information are suitable for being exchanged on at least one of the command queuing interface and command completion interface while data is exchanged on the data transfer interface.

16. The interface system as described in claim 13, wherein data for a transaction is suitable for being moved without respect to a current transaction being requested on a control bus.

17. The interface system as described in claim 13, wherein the back-end device enqueues a transaction on the command queuing interface, at least one transfer of data is accomplished corresponding to the transaction queued on the command queuing interface, and completion status of the transaction is reported on the command completion interface.

18. The interface system as described in claim 13, wherein a plurality of transactions are queued, the transaction are completed without regard to an order the transactions are queued.

19. The interface system as described in claim 13, wherein the first bus interface controller conforms to at least one of a USB standard, SCSI standard, fiber standard and the second bus interface conforms to at least one of a PCI standard and PCI-X standard.

20. The interface system as described in claim 13, wherein a plurality of data transfers on the data transfer interface are executed, the plurality of data transfers corresponding to a transaction queued on the command queuing interface.

* * * * *